(12) United States Patent
Tarlton

(10) Patent No.: US 6,336,238 B1
(45) Date of Patent: Jan. 8, 2002

(54) MULTIPLE PIG SUBSEA PIG LAUNCHER

(75) Inventor: Oran D. Tarlton, League City, TX (US)

(73) Assignee: Oil States Industries, Inc., Arlington, TX (US)

( * ) Notice: Subject to any disclaimer, the term of this patent is extended or adjusted under 35 U.S.C. 154(b) by 0 days.

(21) Appl. No.: 09/500,591

(22) Filed: Feb. 10, 2000

(51) Int. Cl.[7] .................................................. B08B 9/00
(52) U.S. Cl. ...................... 15/3.5; 15/3.51; 15/104.062; 405/170
(58) Field of Search ................... 15/3.5, 3.51, 104.062; 405/170, 158, 169; 134/8; 137/1, 268, 13, 15, 242; 166/70; 285/18, 261

(56) References Cited

U.S. PATENT DOCUMENTS

| | | | |
|---|---|---|---|
| 2,713,909 A | * 7/1955 | Baker | 166/70 |
| 2,915,422 A | 12/1959 | Stone | 134/8 |
| 3,186,014 A | 6/1965 | Allen | 15/3.51 |
| 3,218,659 A | 11/1965 | Rowley | 15/104.062 |
| 3,232,090 A | 2/1966 | Walker | 73/3 |
| 3,266,076 A | 8/1966 | Surber | 15/104.06 |
| 3,322,140 A | 5/1967 | Scott | 137/268 |
| 3,404,421 A | 10/1968 | Surber | 15/104.06 |
| 3,562,014 A | 2/1971 | Childers et al. | 134/8 |
| 3,779,270 A | 12/1973 | Davis | 137/268 |
| 4,135,949 A | 1/1979 | Reese | 134/18 |
| 4,345,893 A | * 8/1982 | Prince | 425/595 |
| 4,401,133 A | 8/1983 | Lankston | 137/268 |
| 4,457,037 A | 7/1984 | Rylander | 15/104.06 |
| 4,477,105 A | 10/1984 | Wittman et al. | 285/18 |
| 4,477,205 A | * 10/1984 | Morrill et al. | 405/169 |
| 4,574,830 A | 3/1986 | Rickey et al. | 137/242 |
| 4,607,893 A | * 8/1986 | Damico | 384/45 |
| 4,709,719 A | 12/1987 | Littleton et al. | 137/268 |
| 4,793,016 A | 12/1988 | Valentine et al. | 15/104.062 |
| 5,025,865 A | * 6/1991 | Caldwell et al. | 166/366 |
| 5,277,248 A | 1/1994 | Breland | 166/70 |
| 5,433,236 A | * 7/1995 | Zollinger et al. | 137/1 |
| 5,759,140 A | * 6/1998 | Egbert | 483/1 |
| 5,873,139 A | * 2/1999 | Goth | 15/104.062 |
| 5,890,531 A | * 4/1999 | Gairns et al. | 165/95 |
| 5,913,637 A | 6/1999 | Rajabali et al. | 405/169 |
| 6,022,421 A | * 2/2000 | Bath et al. | 134/8 |
| 6,039,122 A | * 3/2000 | Gonzalez | 166/379 |
| 6,079,074 A | * 6/2000 | Ellett | 15/104.062 |

* cited by examiner

*Primary Examiner*—David Bagnell
*Assistant Examiner*—Katherine Mitchell
(74) *Attorney, Agent, or Firm*—Howrey Simon Arnold & White, LLP

(57) ABSTRACT

The pig launcher is installed subsea by coupling it to a launcher manifold. The launcher manifold is installed substantially permanently subsea as a part of a pipeline. The pig launcher includes a dual bore collet connector for coupling to the launcher manifold, and a rotary storage magazine for storing the pigs. The launcher manifold can be manufactured, for example, as part of an inline lateral tie-in sled or as part of a pipeline end manifold (PLEM). A branch connection from the pipeline to the pig launcher is provided in the launcher manifold via a piggable Y connection to a dual bore collet connector male hub. The pig launcher is landed and latched to the launcher manifold to complete the pig launching system. A closure valve between the Y connection and the hub prevents a pressure loss when the pig launcher is not installed, and the closure valve is opened to permit passage of the pigs during launching. A throttle valve upstream of the Y connection allows the pipeline pressure to be dropped downstream so that a pig can be launched using upstream pressure. During launching, a kicker valve is opened to bypass the throttle valve and direct the higher upstream pressure through the secondary bore of the dual bore collet connector and into the rotary magazine.

20 Claims, 13 Drawing Sheets

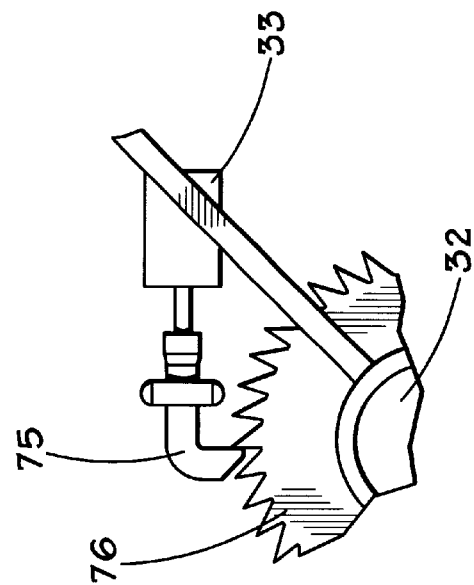
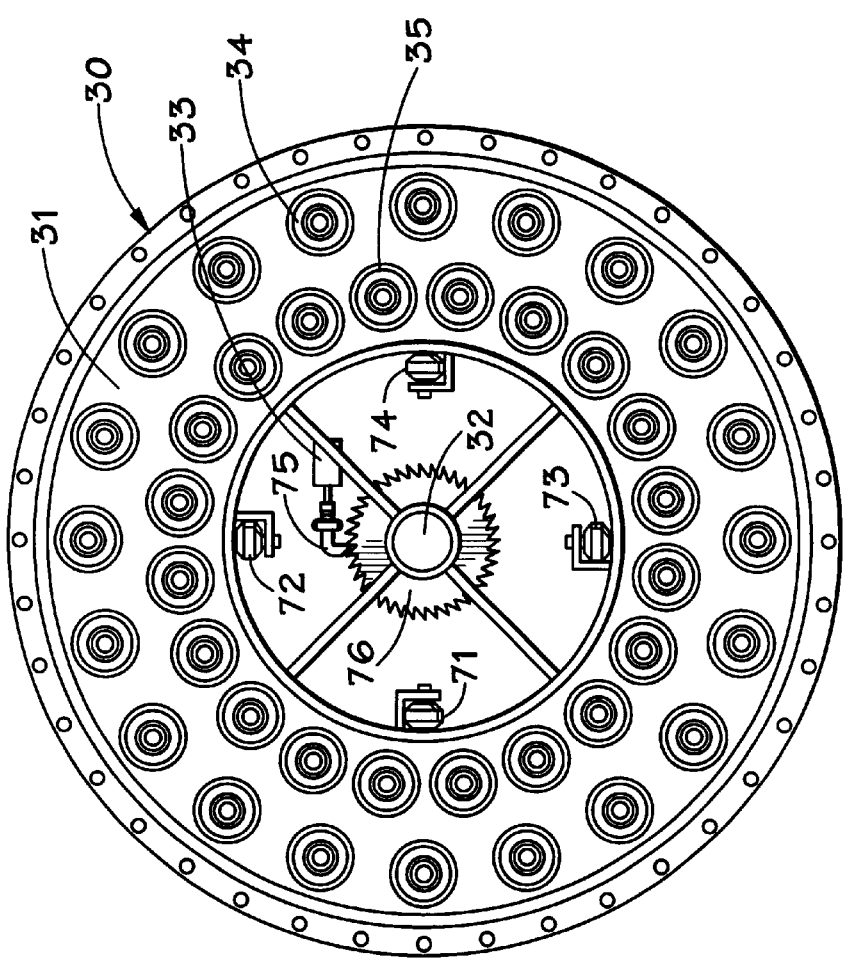

MULTIPLE PIG SUBSEA PIG LAUNCHER

BACKGROUND OF THE INVENTION

1. Field of the Invention

The invention relates to pigging of pipelines, and in particular to launching of pigs into a pipeline from a subsea launch location.

2. Background Art

Pigging is a process of running an object called a pig through the inside of a pipeline from one point to another. The pigs are pushed along by the flow of fluid inside the pipeline. Pigs are often elastomeric spheres or cylinders used to clean or scrape the inside of a pipeline. Pigs can be complex devices with their own on-board power and systems that perform inspections or do mechanical tasks.

Pigs are usually installed in a pipeline through a device called a pig launcher. When installed at a subsea location, there must not be any significant loss of fluid from the pipeline into the environment. Typically a subsea pig launcher may launch one to three pigs. The pig launcher is then recovered to the surface, refilled with pigs, and reinstalled subsea. This process is costly and time consuming.

SUMMARY OF THE INVENTION

In accordance with one aspect of the invention, there is provided a pig launcher adapted for subsea installation to a subsea pipeline manifold for launching pigs into a subsea pipeline. The pig launcher includes a dual-bore collet connector and a magazine for storing pigs. The dual-bore collet connector is adapted for subsea engagement with a mating connector on the subsea pipeline manifold, and has a first bore for passing the pigs into the subsea manifold and at least a second bore for receiving pipeline fluid from the subsea pipeline manifold. The magazine can index at least one pig to at least one launch position. The magazine is coupled to the dual-bore collet connector for ejecting a pig at the launch position into and through the first bore of the dual-bore collet connector in a stream of the pipeline fluid received through the second bore of the dual-bore collet connector.

In accordance with another aspect, the invention provides a pig launcher adapted for subsea installation to a subsea pipeline manifold for launching multiple pigs into a subsea pipeline. The pig launcher includes a dual-bore collet connector adapted for subsea engagement with a mating connector on the subsea pipeline manifold, and a rotary magazine for storing multiple pigs. The dual-bore collet connector has a first bore for passing the pigs into the subsea manifold, and at least a second bore for receiving pipeline fluid from the subsea pipeline manifold. The rotary magazine includes a rotor defining pig storage locations and having an actuator coupled to the rotor for rotating the rotor to index the pigs to at least one launch position. The rotary magazine is coupled to the dual-bore collet connector for ejecting a pig at the launch position into and through the first bore of the dual-bore collet connector in a stream of the pipeline fluid received through the second bore of the dual-bore collet connector.

In accordance with yet another aspect, the invention provides a subsea pig launching system for launching pigs into a subsea pipeline. The subsea pig launching system includes a launcher manifold and a pig launcher. The launcher manifold is adapted for coupling between an upstream section of the subsea pipeline and a downstream section of the subsea pipeline to convey pipeline fluid from the upstream section of the pipeline through the launcher manifold and to the downstream section of the subsea pipeline. The pig launcher has a dual-bore collet connector and a magazine for storing a multiplicity of pigs. The collet connector is engageable with a mating connector on the launcher manifold. The dual-bore collet connector has a first bore for passing the pigs into the launcher manifold and at least a second bore for receiving pipeline fluid from the launcher manifold. The magazine indexes at least one pig to at least one launch position, and is coupled to the dual-bore collet connector for ejecting a pig at the launch position into and through the first bore of the dual-bore collet connector in a stream of the pipeline fluid received through the second bore of the dual-bore collet connector. The launcher manifold has a closure valve for closing off flow of pipeline fluid to the first bore of the collet connector when the collet connector is released, and the launcher manifold has at least one valve for diverting pipeline fluid from the upstream section of the subsea pipeline to the second bore of the collet connector for ejecting the pig at the launch position.

BRIEF DESCRIPTION OF THE DRAWINGS

Other objects and advantages of the invention will become apparent upon reading the following detailed description with reference to the accompanying drawings wherein:

FIG. 7 is a top view of the rotary pig magazine as seen with the cover of the magazine removed;

FIG. 8 is a detailed top view of an indexing cylinder introduced in FIG. 7;

Figure 1:
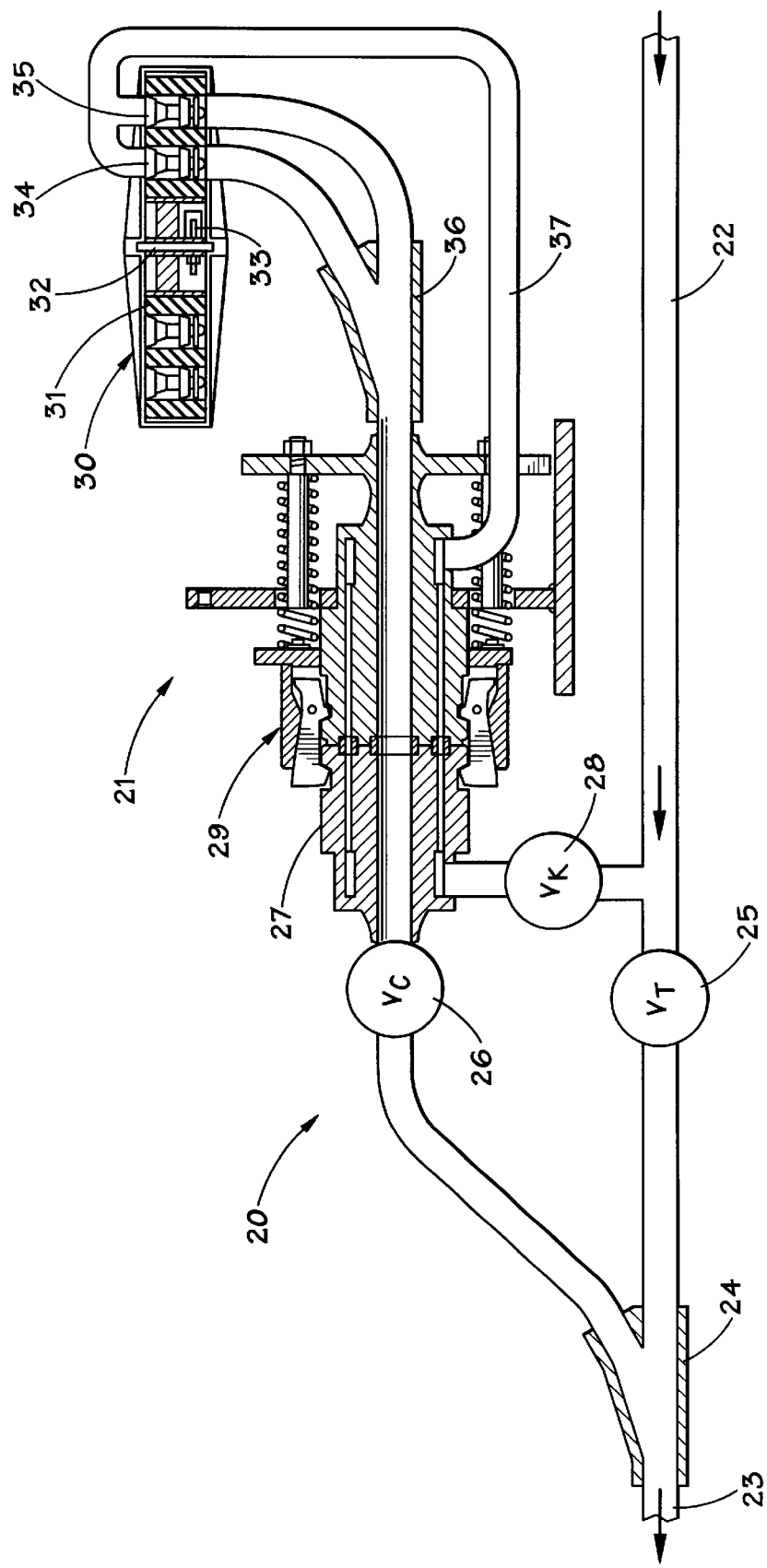
FIG. 1 is a schematic diagram of a pig launching system in accordance with an embodiment of the invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a schematic diagram of a pig launching system in accordance with an embodiment of the invention. The pig launching system includes a launcher manifold 20 and a pig launcher 21. The launcher manifold is substantially permanently installed between a main pipeline upstream section 22 and a main pipeline downstream section 23. The launcher manifold includes a piggable Y connector 24, a throttle valve ($V_T$) 25, a closure valve ($V_C$) 26, a dual-bore collet connector male hub 27, and a kicker valve ($V_K$) 28. The piggable Y connector 24 has its common or outlet port attached to the main pipeline downstream section 23, and its main branch port coupled to the main pipeline upstream section 22 via the throttle valve 25. The piggable Y connector 24 has its side branch port coupled to the central bore of the dual-bore collet connector male hub 27 via the closure valve 26. The closure valve 26 prevents a pressure loss when the pig launcher is not installed, and the closure valve is opened to permit passage of the pigs during launching. The throttle valve 25 allows the pipeline pressure to be dropped downstream so that a pig can be launched using upstream pressure. During launching, the kicker valve 28 is opened to bypass the throttle valve and direct the higher upstream pressure through the pig launcher 21.

The pig launcher 21 includes a dual bore collet connector female assembly 29, a rotary pig magazine 30, and a piggable Y connector 36. The rotary pig magazine 30 includes a rotor 31 having cylindrical pig holding chambers. The rotor 31 is mounted on a shaft 32, and an indexing cylinder 33 is mounted within the rotary pig magazine 30 for incrementally rotating the rotor to index a next pig holding chamber into a pig release position. To hold a large number of pigs, the wheel 31 includes two concentric circles of pig holding chambers. As shown in FIG. 1, for example, a pig 34 is in an inner circle of pig holding chambers, and a pig 35 is in an outer circle of pig holding chambers. Although each of the pigs 34 and 35 appears to be near a pig release position, the chambers in the inner circle of pig holding chambers are offset in circumferential position with respect to the chambers in the outer circle of pig holding chambers (for example as shown in FIG. 7) so that no more than one pig will be in a release position at any given time. An ejector pressure conduit 37 couples the outer bore of the female dual-bore collet connector assembly 29 to respective inner and outer pig release positions of the rotary magazine.

FIG. 1 shows the pig launching system in which the pig launcher 21 is in its installed state with respect to the launcher manifold. In the installed state, the dual-bore collet connector male hub 27 is engaged with the female dual-bore collet connector assembly 29 to provide sealing engagement between the respective bores in the male and female connector components. The connector components, however, are designed to permit the pig launcher 21 to be disengaged from the subsea launcher manifold 20, retrieved to the surface for refilling of pigs into the rotary magazine 30, and then reinstalled in an engaged relationship with respect to the subsea launcher manifold 20.

Figure 2:
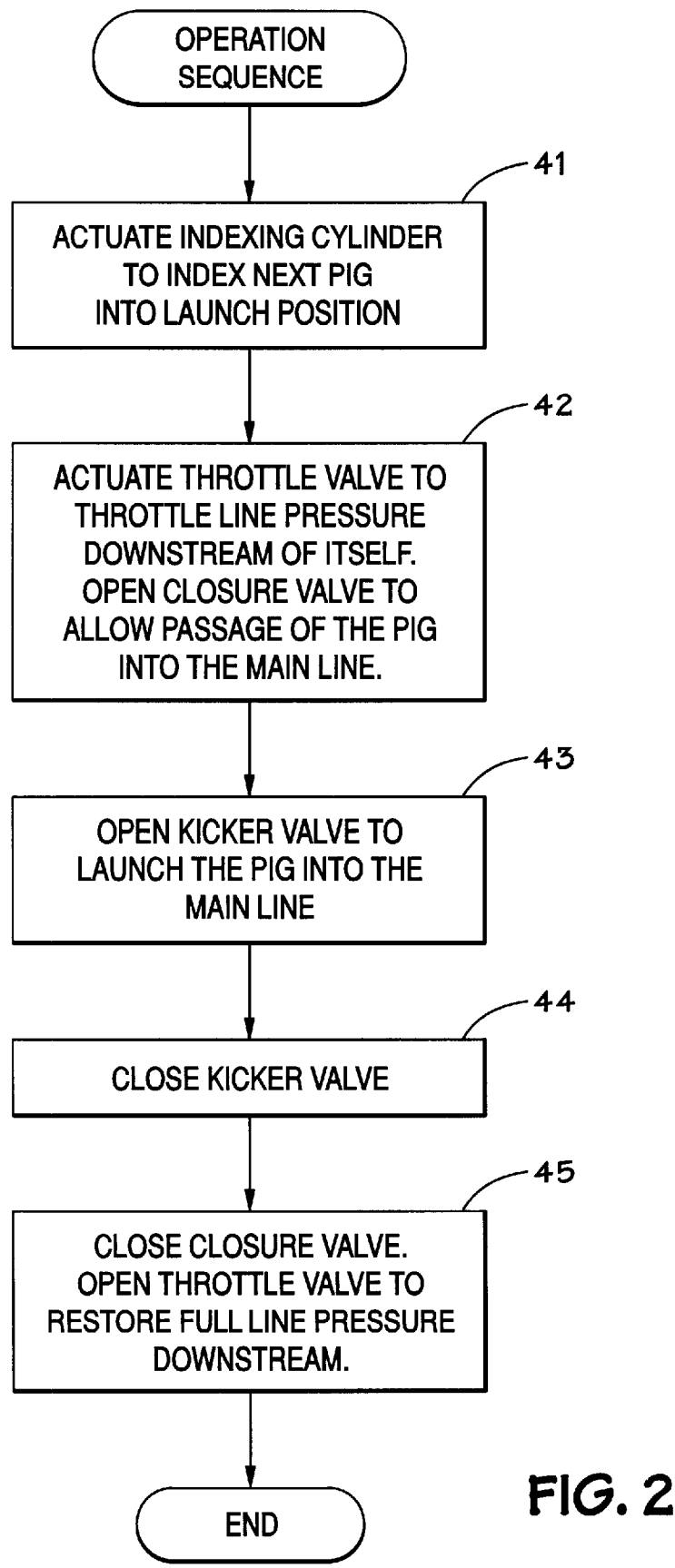
FIG. 2 is a flowchart of an operation sequence for launching a pig from the pig launching system of FIG. 1.

With reference to FIG. 2, there is shown a flowchart of an operation sequence for launching a pig from the pig launching system of FIG. 1. In a first step 41 of FIG. 2, the indexing cylinder (33 in FIG. 1) is actuated to index a next pig into a launch position. Although this step need not be performed if a pig is already in a launch position, it may be possible to simplify the control of the system if the indexing cylinder is always actuated each time a pig is launched. Next, in step 42, the throttle valve (25 in FIG. 1) is actuated to throttle the pipeline pressure downstream of itself. In addition, the closure valve (26 in FIG. 1) is opened to allow passage of the pig from the magazine (30 in FIG. 1) to the main pipeline downstream section (23 in FIG. 1). In step 43, the kicker valve (28 in FIG. 1) is opened to apply the upstream pipeline pressure to the ejector pressure conduit (37 in FIG. 1), thereby launching the pig through the central bore of the male and female collet connector components (27, 29 in FIG. 1) and into the main line downstream section (23 in FIG. 1). In step 44, the kicker valve is closed. Finally, in step 45, the closure valve is closed, and the throttle valve is opened to restore full line pressure downstream.

Figure 3:
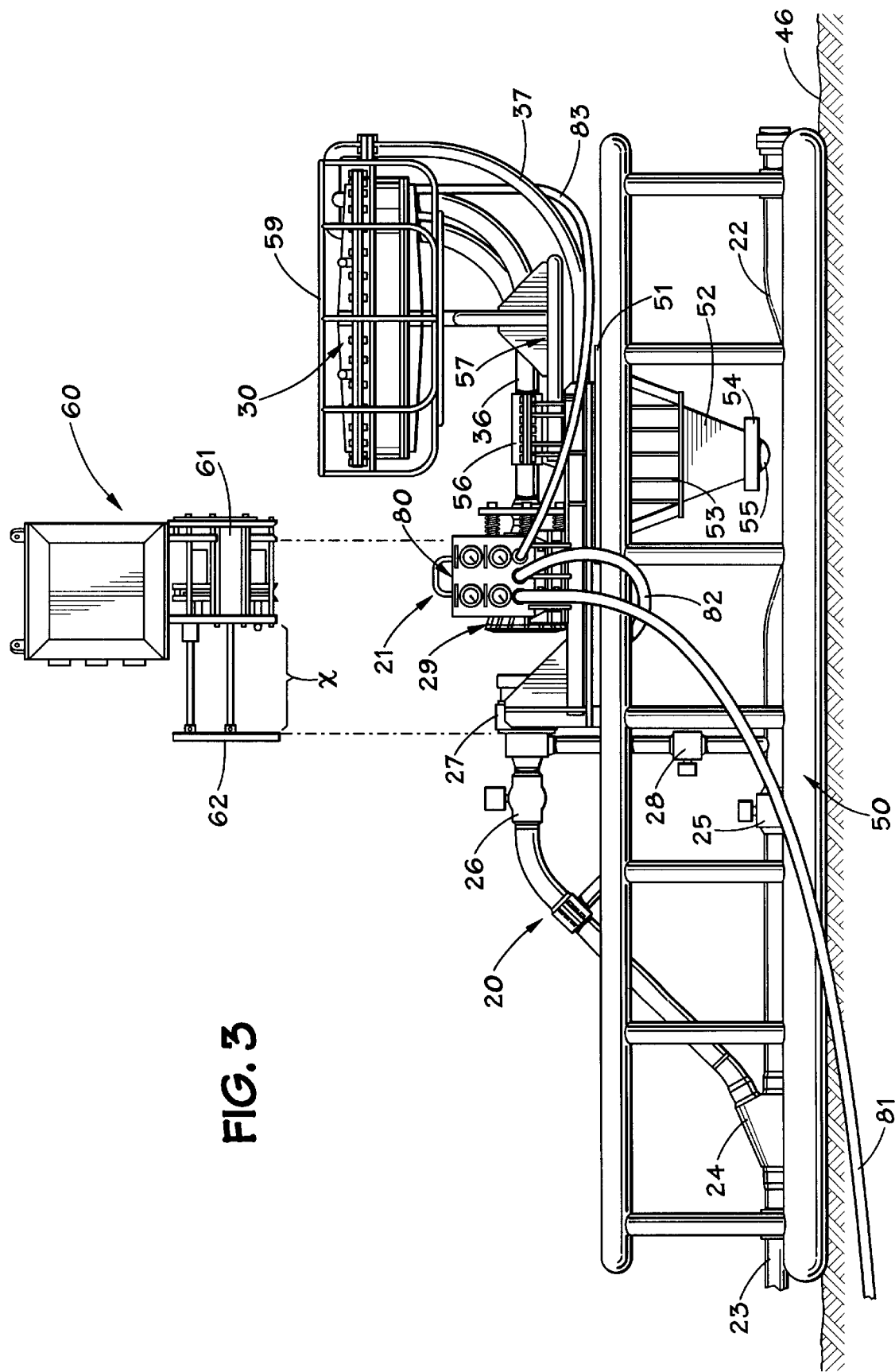
FIG. 3 is an elevation view of a pig launching system of the invention manufactured as part of an inline lateral tie-in sled and installed on a seabed.

With reference to FIG. 3, there is shown a specific embodiment of the pig launching system of FIG. 1 as assembled on an in-line lateral tie-in sled 50. The sled rests on a seabed 46. In this configuration, the collet connector components (27, 29) are arranged substantially horizontally with respect to the seabed 46. In addition to the female dual-bore collet connector assembly 29 and the rotary magazine 30, the pig launcher includes a base plate 51 having an inverted pyramid 52 for engaging an inverted pyramidal receiver 53 secured to the top of the sled 50. The inverted pyramid 52 is terminated in a ring 54 and a round cap 55 instead of a sharp apex, in order to avoid any damage that might be caused by a sharp apex during the installation process. The female dual-bore collet connector assembly 29 and the rotary magazine 30 are secured in a fixed relationship with respect to each other by a clamp 56 and a magazine support frame 57. A protective cage 59 surrounds the rotary magazine 30 and is secured to the support frame 57.

Figure 4:
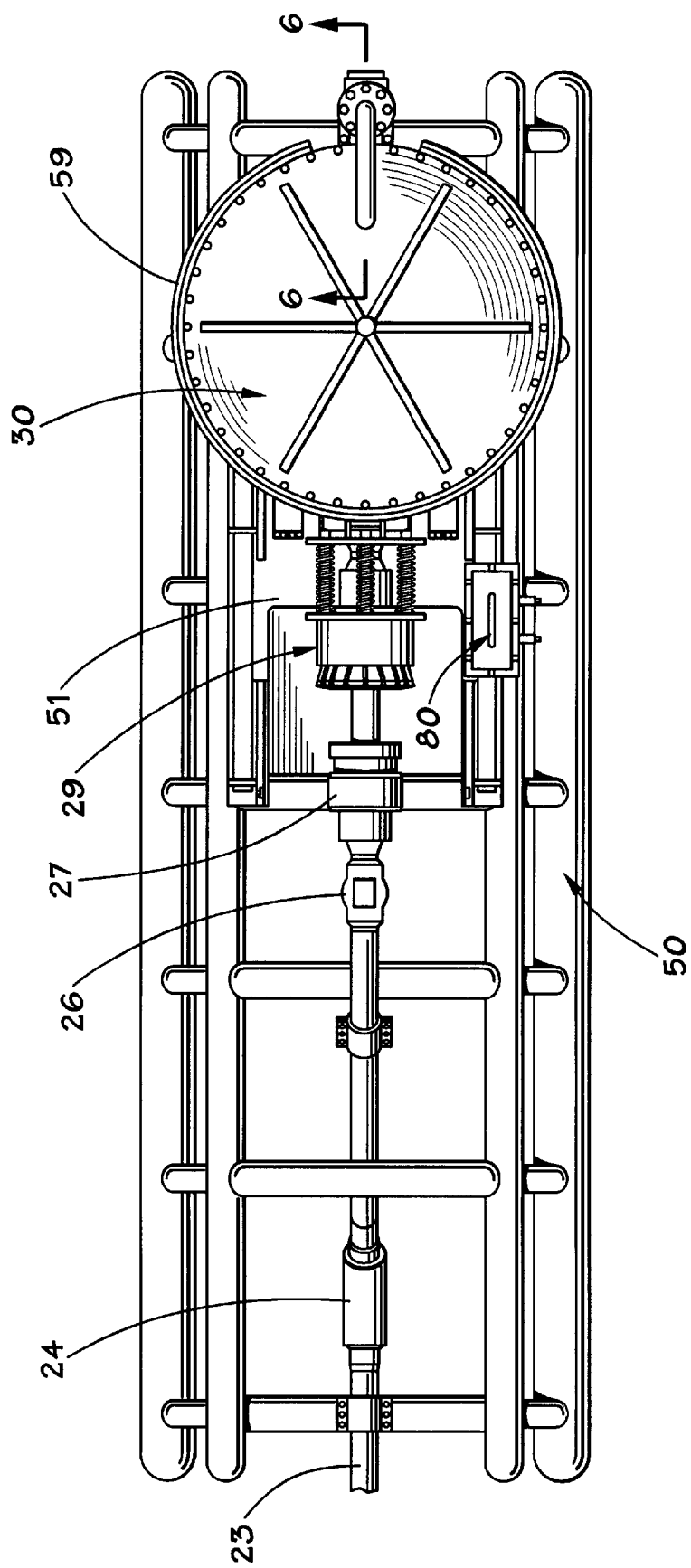
FIG. 4 is a top view of the pig launching system of FIG. 3.
Figure 6:
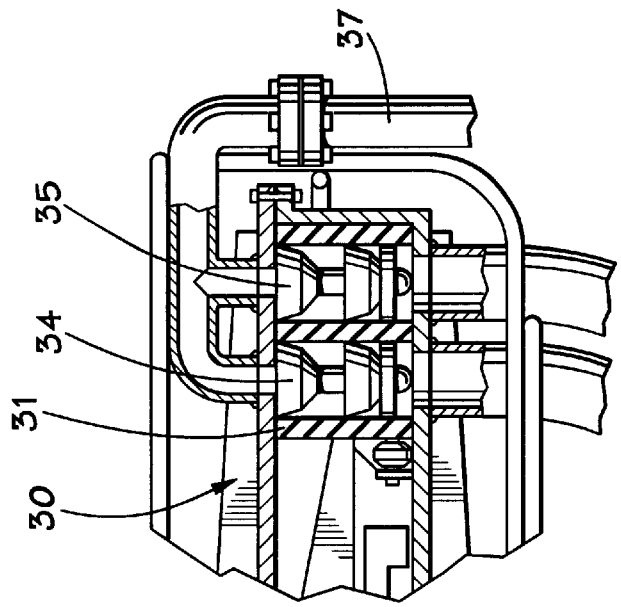
FIG. 6 is a cross-sectional elevation view of the rotary magazine along section line 6—6 in FIG. 4.
Figure 5:
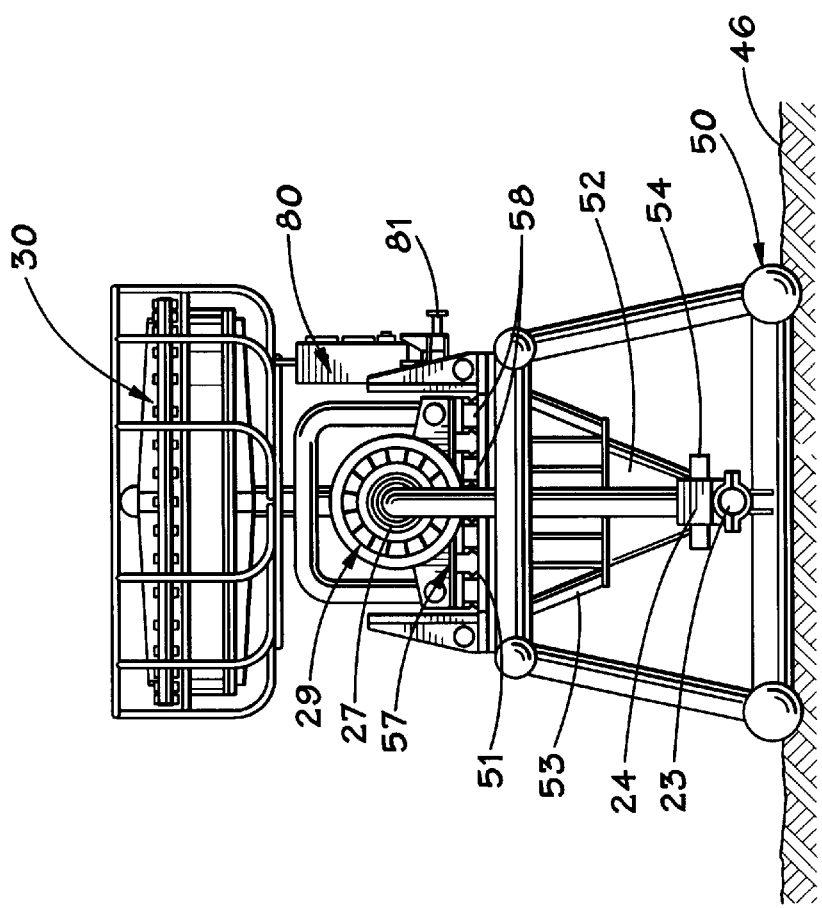
FIG. 5 is an end view of the pig launching system of FIG. 3.

As seen in FIG. 5, the base of the support frame 57 is coupled by slides 58 to the base plate 51 having the inverted pyramid 52. Therefore, during subsea installation of the pig launcher onto the launcher manifold, the pig launcher can be received onto the launcher manifold in the desired relationship as shown in FIGS. 3 and 4, in which there is some spacing between the dual bore collet connector male hub 27 and the female dual bore collet connector assembly 29.

In order to engage the dual-bore collet connector male hub 27 into the female dual-bore collet connector assembly 29, a conventional running tool 60 is lowered onto the dual-bore collet connector male hub 27 and the female dual-bore collet connector assembly 29. Hydraulic cylinders, including the cylinder 61, are then actuated in the running tool 60 to pull a horseshoe-shaped plate 62 inward to reduce the distance "x" shown in FIG. 3 and thereby pull the running tool 60 and the entire pig launcher 21 leftward in FIG. 3 with respect to the sled 50 until the dual-bore collet connector male hub 27 mates with the female dual-bore collet connector assembly 29. Once the male hub 27 has been mated with the female assembly 29, the running tool 60 can be removed by lifting it vertically off the pig launching system.

FIG. 7 shows a detailed view of the rotor 31, including forty pig chambers. The rotor 31 is supported on rollers 71, 72, 73, 74. The indexing cylinder 33 actuates a pawl 75 engaging a gear 76 secured to the wheel 31. The pawl 75 and gear 76 are further shown in FIG. 8.

Figure 10:
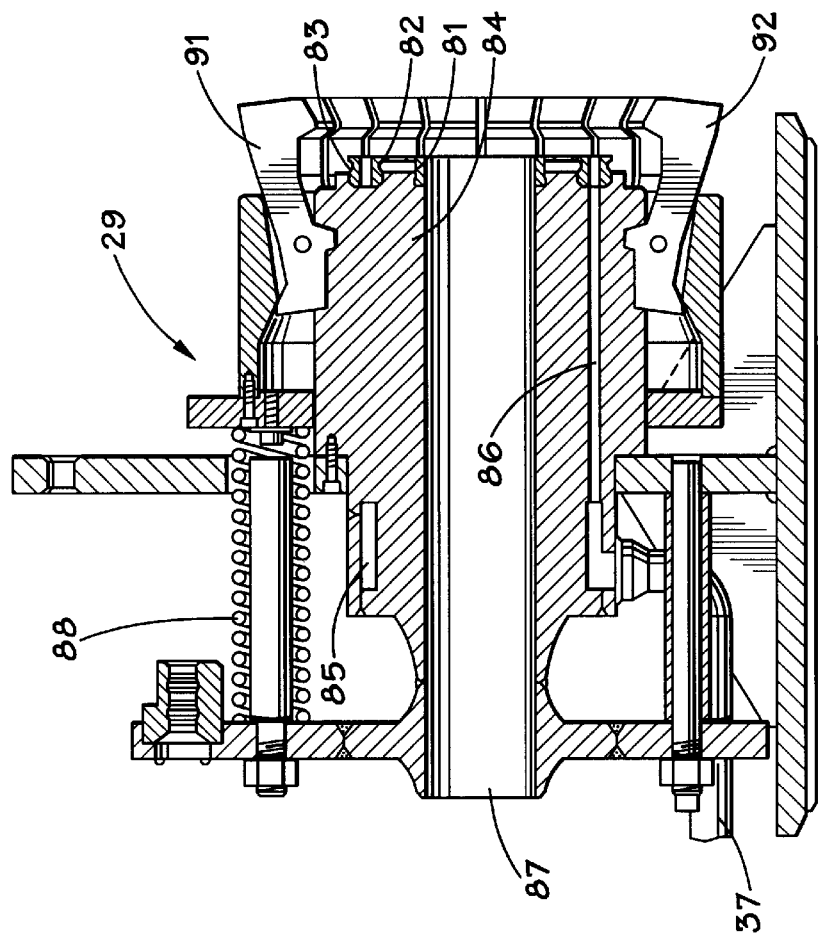
FIG. 10 is a cross-sectional elevation view of the dual-bore collet connector along section line 10—10 in FIG. 9.
Figure 9:
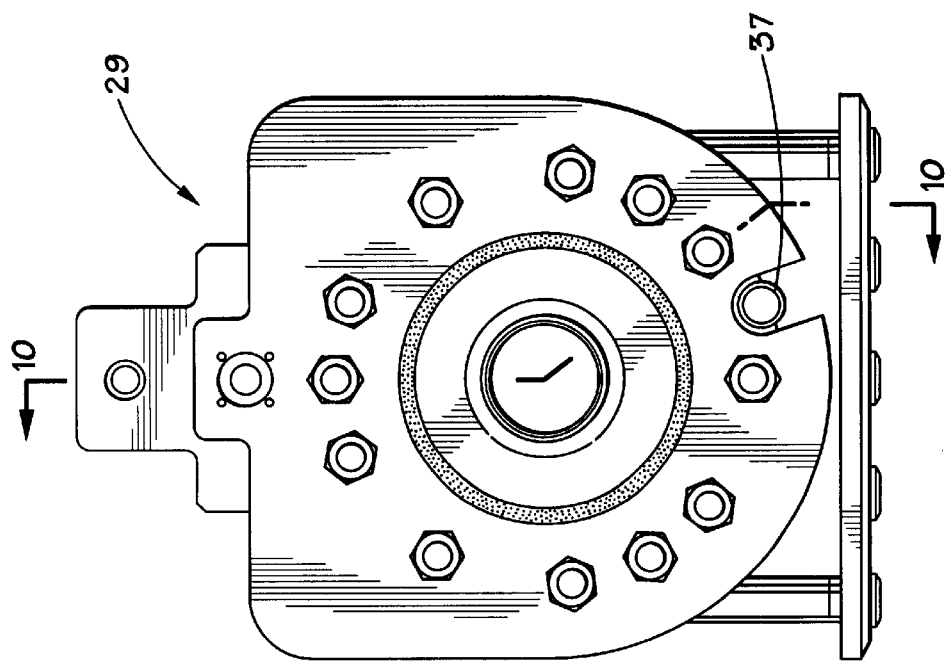
FIG. 9 is a left end view of a dual-bore collet connector introduced in FIG. 1 and also seen in FIGS. 3, 4 and 5.
Figure 11:
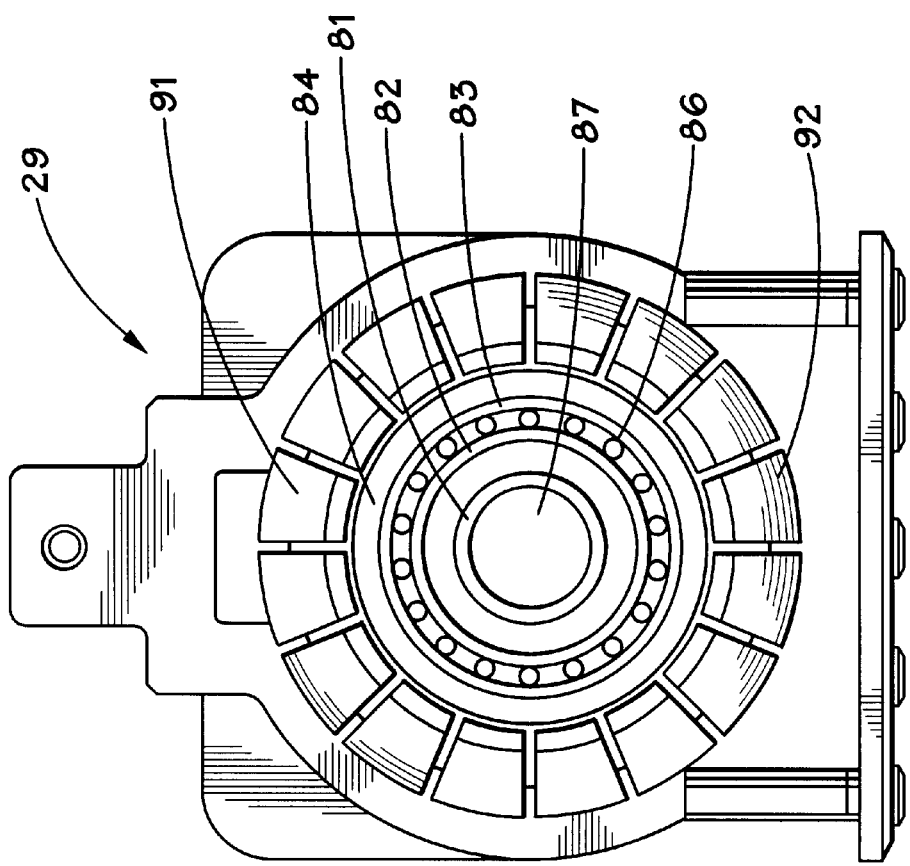
FIG. 11 is a right end view of the dual-bore collet connector.

FIGS. 9, 10 and 11 show the female dual-bore collet connector assembly 29. Three concentric annular seals 81, 82, 83 are embedded in the face of the female hub 84. An annular chamber 85 in the female hub 84 is ported to the ejector pressure conduit 37. A number of longitudinal bores, including the bore 86, are arranged circumferentially around the central bore 87 to permit fluid to flow from the annular chamber 85 to the annular region of the face of the female hub 84 between the second seal 82 and the third seal 83.

FIG. 10 shows the collet fingers 91, 92 in an open position, which would occur during insertion of the male hub into the female collet connector assembly. Normally, a number of compression springs, such as the spring 88, keep the fingers 91, 92 in a closed position. Further details of a collet actuating mechanism are disclosed, for example, in Wittman et al. U.S. Pat. No. 4,477,105, incorporated herein by reference.

Figure 12:
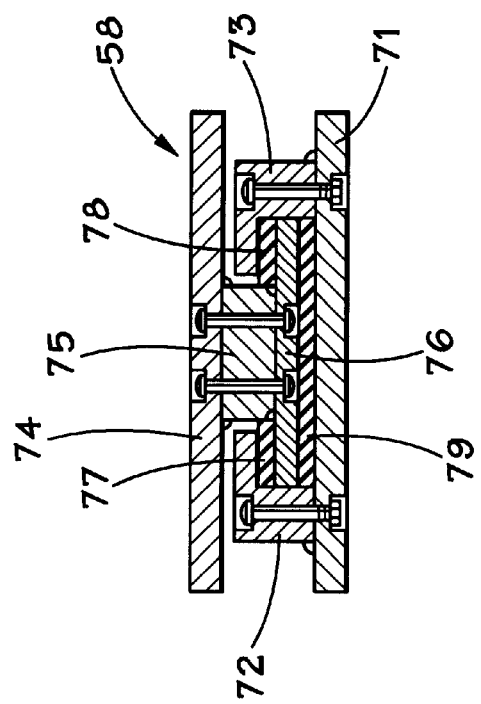
FIG. 12 is a cross-sectional end view of one of the slides used for mounting of the dual-bore collet connector and the rotary magazine to the base of the pig launcher as shown in FIGS. 3, 4 and 5.

FIG. 12 shows a cross-section of one of the slides 58. The slide 58 has a T-slot geometry, in which the T-slot is formed by a lower base plate 71 and side rails 72, 73. An upper base plate 74 is secured to depending plates 75 and 76 forming a T-shaped member. TEFLON™ (polytetrafluroethylene) sheets 77, 78, and 79 reduce friction between the sliding surfaces.

Figure 13:
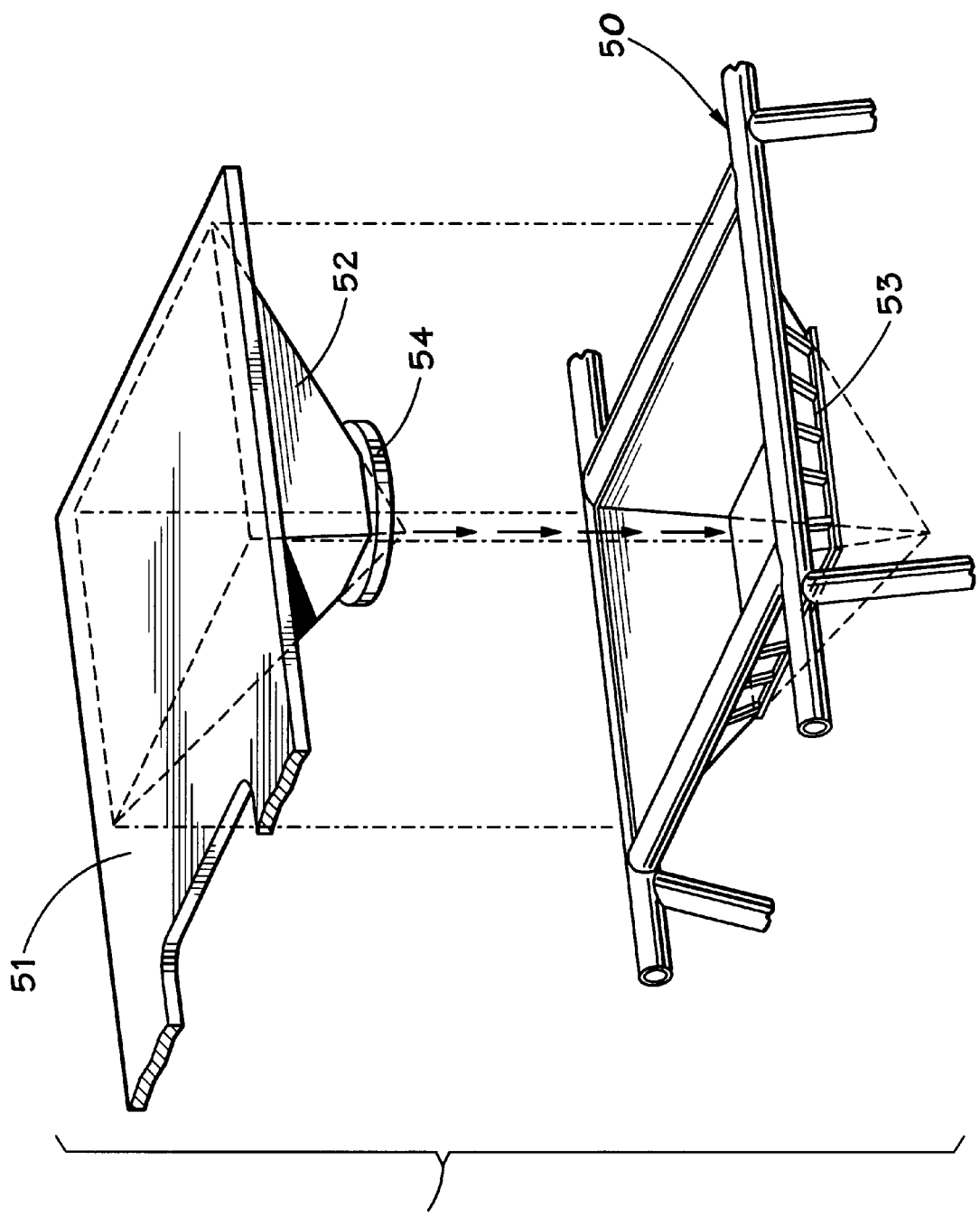
FIG. 13 is a perspective view illustrating engagement of the base of the pig launcher with the inverted pyramidal receiver in the inline lateral tie-in sled during subsea installation.

FIG. 13 shows that the inverted pyramid 52 depending from the pig launcher base plate 51 has a rectangular base. Therefore, once the inverted pyramid 52 is received in the pyramidal receiver 53 of the sled 50, the base plate 51 will be aligned longitudinally with respect to the sled.

As shown in FIG. 3, the pig launching system includes a hydraulic control unit 80 for controlling successive pig launching operation sequences of FIG. 2. The hydraulic control unit 80 is powered by pressurized hydraulic fluid from an umbilical 81, which could depend from a surface vessel (not shown) or could extend from a remotely operated subsea vehicle (ROV) (not shown). As seen in FIG. 3, the hydraulic control unit 80 has a tube 82 of hydraulic lines for controlling the valves 25, 26, 28, and a tube 83 of hydraulic lines for controlling the indexing cylinder in the rotary magazine 30. Conventional hot-stab connectors (not shown) (per industry standard API 17d) connect the hydraulic lines in the tubes 82 and 83 to the valve actuators and the indexing cylinder, respectively, to permit the control unit to be connected to the pig launching system subsea during installation of the pig launcher upon the launching manifold, and to permit the control unit to be removed with the pig launcher when pigging operations are finished. The hydraulic control unit 80 is releasably secured to the sled via a locking pin 81 shown in FIG. 5.

Figure 14:
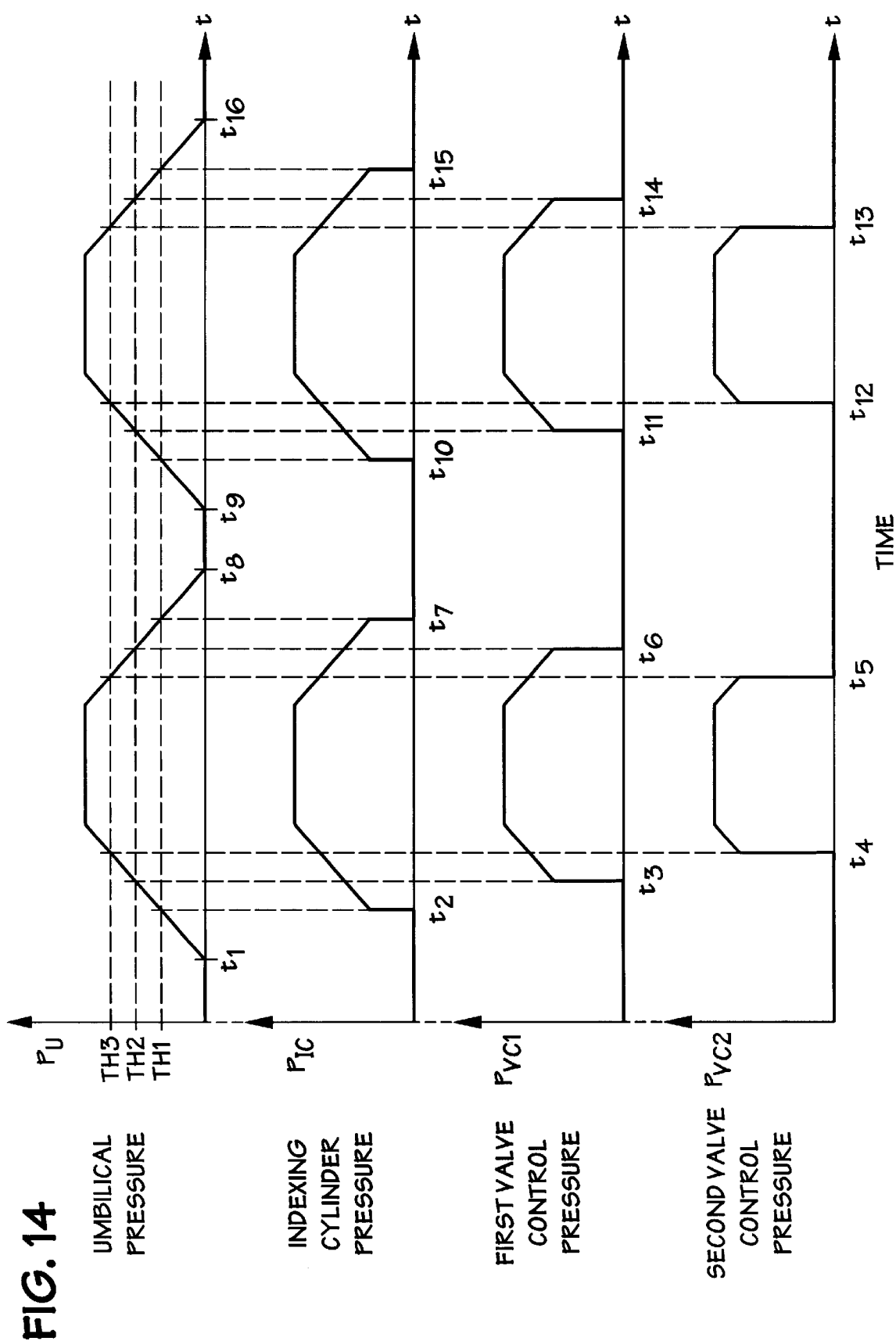
FIG. 14 is a timing diagram showing various pressures in a hydraulic control system for the pig launching system of FIG. 1.

Preferably the hydraulic control unit 80 is operated by cycling the pressure of hydraulic fluid in the umbilical 81 from substantially zero pressure up to about 1,500 psi. Pressure-sensing valves open and close to actuate the indexing cylinder and hydraulic actuators for the valves 25, 26, and 28 in the sequence of FIG. 2. As shown in FIG. 14, for example, there are three successive pressure thresholds TH1, TH2, TH3 over the umbilical pressure ($P_U$) range of 0 to 1,500 psi. An indexing cylinder pressure ($P_{IC}$) is produced when the umbilical pressure exceeds the threshold TH1, a first valve control pressure ($P_{VC1}$) is produced when the umbilical pressure exceeds the threshold TH2, and a second valve control pressure ($P_{VC2}$) is produced when the umbilical pressure exceeds the threshold TH3. Therefore, a first pig is launched over a first cycle ($t_1$ to $t_8$) of the umbilical pressure, and a second pig is launched over a second cycle ($t_9$ to $t_{16}$) of the umbilical pressure. During the first cycle, the indexing cylinder is actuated at $t_2$, the throttle valve is closed at $t_3$, the closure valve is opened at $t_3$, the kicker valve is opened at $t_4$, the kicker valve is closed at $t_5$, the throttle valve is opened at $t_6$, the closure valve is closed at $t_6$, and the indexing cylinder is depressurized at $t_7$. During the second cycle, the indexing cylinder is actuated at $t_{10}$, the throttle valve is closed at $t_{11}$, the closure valve is opened at $t_{11}$, the kicker valve is opened at $t_{12}$, the kicker valve is closed at $t_{13}$, the throttle valve is opened at $t_{14}$, the closure valve is closed at $t_{14}$, and the indexing cylinder is depressurized at $t_{15}$.

Figure 15:
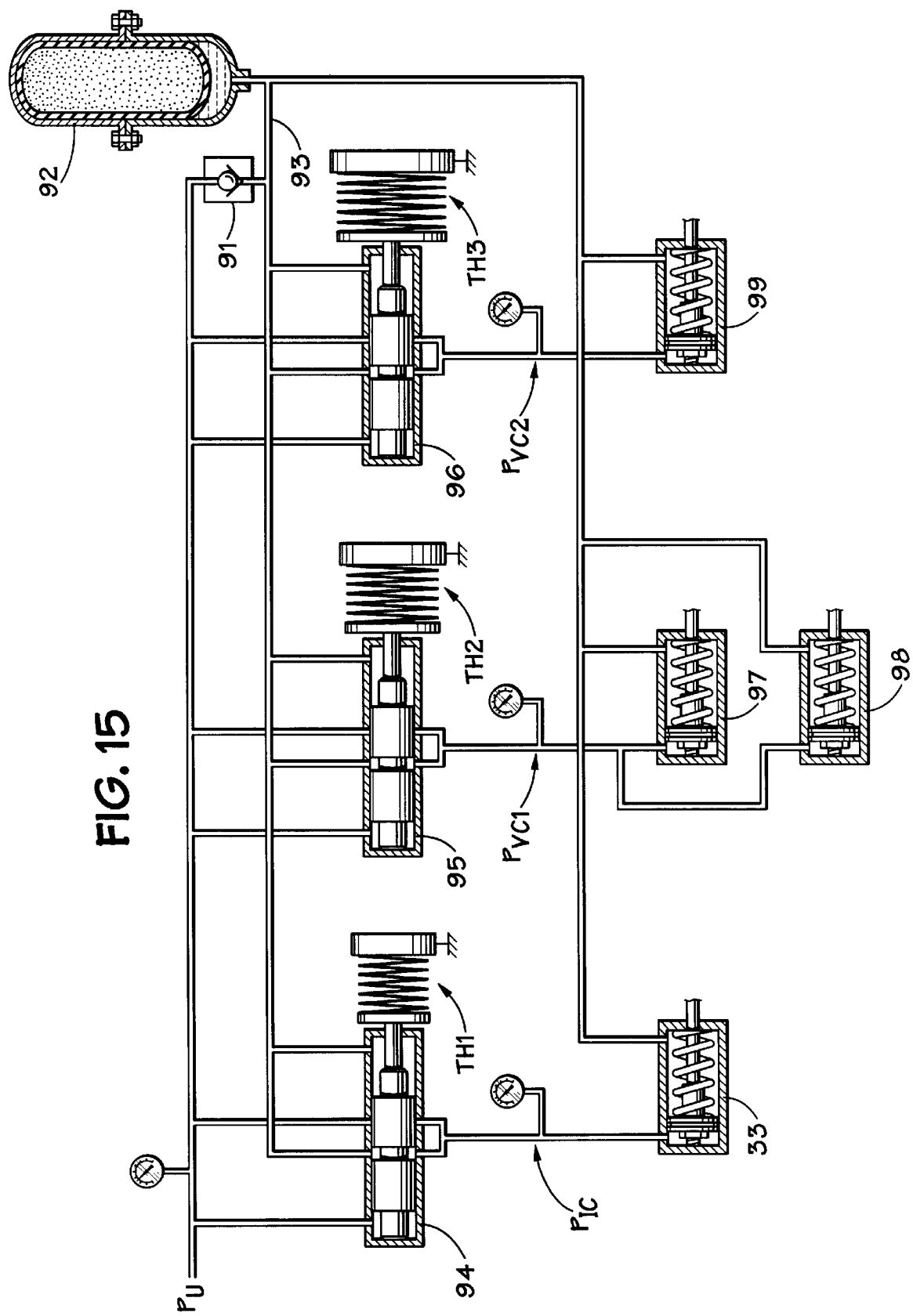
FIG. 15 is a schematic diagram of components for the hydraulic control system having the characteristics introduced in FIG. 13.

With reference to FIG. 15, there is shown a hydraulic control system that has the characteristics shown in FIG. 14. The hydraulic control system has a check valve 91 and hydraulic accumulator 92 for producing a low hydraulic pressure in a line 93. Pressure-sensitive valves 94, 95, and 96 open and close at the pressure thresholds TH1, TH2, and TH3, to produce the control pressures $P_{IC}$, $P_{VC1}$, and $P_{VC2}$. The control pressure $P_{IC}$ actuates the indexing cylinder 33, the control pressure $P_{VC1}$ actuates cylinders 97 and 98 operating the throttle valve (25 in FIG. 1) and the closure valve (26 in FIG. 1), and the control pressure $P_{VC2}$ actuates a cylinder 99 operating the kicker valve (28 in FIG. 1). Suitable hydraulic control system components can be obtained from Womack International, Inc., 700 Walnut Ave., Mare Island, Calif. 94592.

Figure 16:
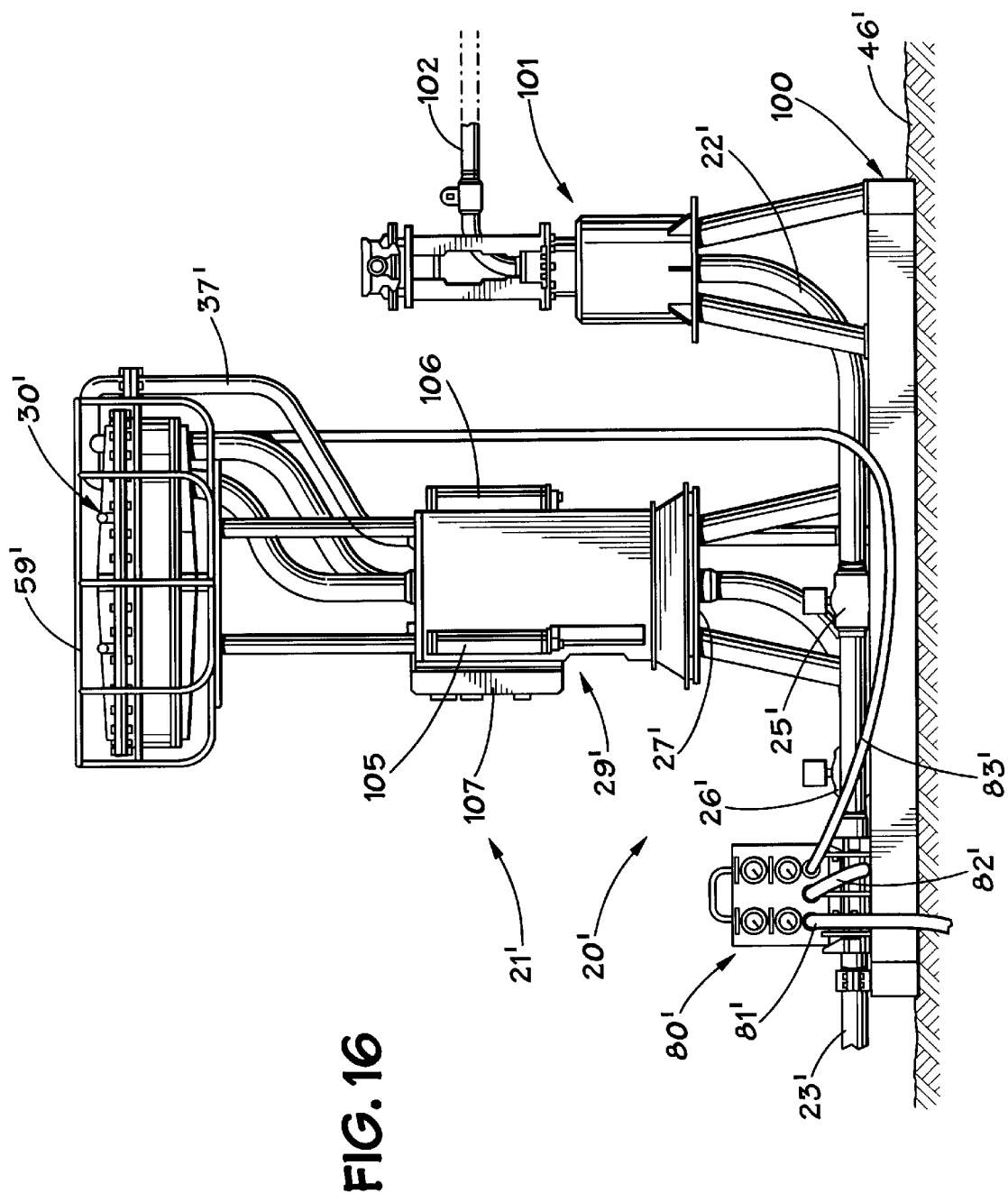
FIG. 16 is an elevation view of a pig launching system of the invention including a pipeline end manifold (PLEM) installed on a seabed.
Figure 17:
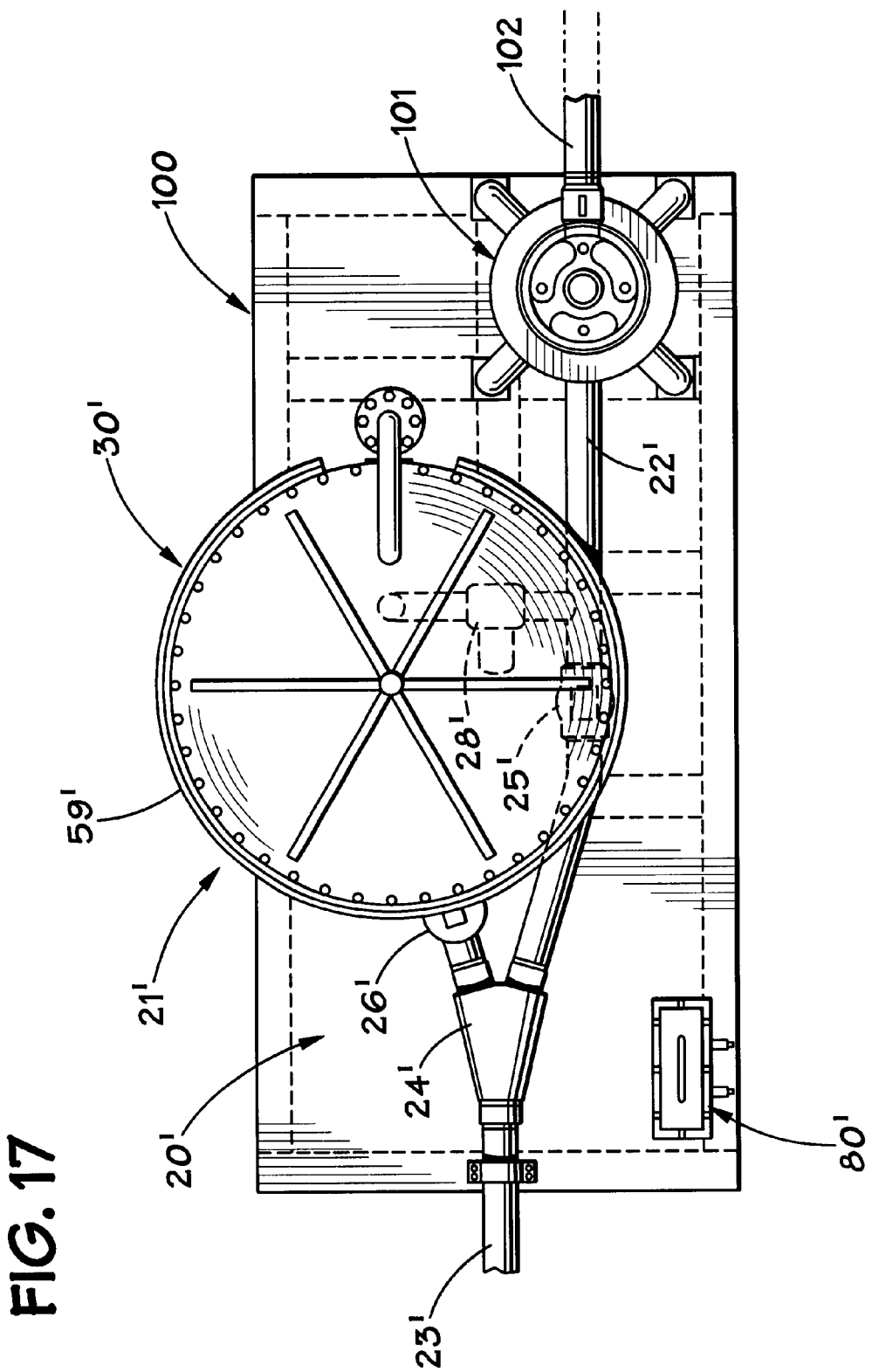
FIG. 17 is a top view of the pig launching system of FIG. 16.

With reference to FIGS. 16 and 17, there is shown a second embodiment of a pig launching system in accordance with the invention, in which the pig launcher 21' is installed vertically upon a pipeline end manifold (PLEM). Components in FIGS. 16 and 17 which are similar to components in FIGS. 1 and 3 to 5 are designated with similar, but primed, reference numerals. As seen in FIG. 16, the PLEM rests on a seabed 46', and the dual-bore collet connector components 27', 29' are aligned vertically with respect to the seabed 46'. The components of the launching manifold 20' in FIGS. 16 and 17 are assembled on a rectangular base pad 100. The launching manifold 20' further includes a vertically-oriented, single-bore collet connector 101 for connecting an upstream pipeline 102 to the upstream pipeline section 22'. The pig launching system of FIG. 16 has the advantage that the pig launcher 21' is supported on the launcher manifold 20' simply by the engagement of the dual-bore collet connector of the pig launcher with the mating connector on the launcher manifold. For the vertical orientation, however, it is desirable for the female collet connector to have hydraulic cylinders 105, 106, which can be actuated to release the connector. This is desirable because it is rather difficult to use the running tool (60 of FIG. 3) for engaging or disengaging a vertically-oriented collet connector. Hydraulic power for actuating the cylinders 105, 106 is supplied, for example, from an external source (such as an umbilical or ROV) through a "hot-stab" connection on a panel 107 at the time of installation or removal of the pig launcher 21' from the launcher manifold 100.

In view of the above, there has been described a pig launching system in which a large number of pigs can be launched into a pipeline from a subsea location. The pig launcher can be removed from the subsea location, refilled with pigs, and re-installed without shutting off the pipeline flow. The pig launching system can be assembled in a horizontal configuration, for example on a lateral tie-in sled, or in a vertical configuration, for example on a pipeline end manifold, to best suit seabed conditions and any pre-existing subsea pipeline facilities.

What is claimed is:

1. A pig launcher adapted for subsea installation to a subsea pipeline manifold by subsea engagement with a mating connector on the subsea pipeline manifold for launching pigs into a subsea pipeline and for receiving pipeline fluid from the subsea pipeline manifold, said pig launcher comprising:

a dual-bore collet connector adapted for the subsea engagement, the dual-bore collet connector having a first bore for passing the pigs from the pig launcher and at least a second bore for receiving the pipeline fluid; and a magazine for storing the pigs and indexing at least one pig to at least one launch position, the magazine being coupled to the dual-bore collet connector for ejecting a pig at the launch position into and through the first bore of the dual-bore collet connector in a stream of the pipeline fluid received through the second bore of the dual-bore collet connector.

2. The pig launcher as claimed in claim 1, wherein the magazine defines a multiplicity of pig-storage chambers, each chamber for storing a respective pig, and the magazine includes an actuator for successively indexing the chambers to the launch position.

3. The pig launcher as claimed in claim 1, further including an ejector pressure conduit coupled between the second bore of the dual-bore collet connector and the magazine for applying pipeline fluid pressure to the pig in the launch position for ejecting the pig in the launch position from the magazine.

4. The pig launcher as claimed in claim 1, wherein the dual-bore collet connector is a female dual-bore collet connector adapted for subsea engagement with a mating male hub on the subsea pipeline manifold.

5. The pig launcher as claimed in claim 1, further including an inverted pyramidal base for seating on a pyramidal receiver of the subsea manifold and coupled to the dual-bore collet connector for alignment of the dual-bore collet connector with the mating connector on the subsea pipeline manifold.

6. The pig launcher as claimed in claim 5, which includes at least one slide coupling the dual-bore collet connector to the pyramidal receiver to permit the dual-bore collet connector to translate with respect to the pyramidal receiver during engagement of the dual-bore collet connector with the mating connector on the subsea pipeline manifold.

7. A pig launcher adapted for subsea installation to a subsea pipeline manifold by subsea engagement with a mating connector on the subsea pipeline manifold for launching pigs into a subsea pipeline and for receiving pipeline fluid from the subsea pipeline manifold, said pig launcher comprising:

a dual-bore collet connector adapted for the subsea engagement, the dual-bore collet connector having a first bore for passing the pigs from the pig launcher and at least a second bore for receiving the pipeline fluid; and a magazine for storing the pigs and indexing at least one pig to at least one launch position, the magazine being coupled to the dual-bore collet connector for ejecting a pig at the launch position into and through the first bore of the dual-bore collet connector in a stream of the pipeline fluid received through the second bore of the dual-bore collet connector, wherein the first bore of the dual-bore collet connector is a central bore and the second bore of the dual-bore collet connector is one of a plurality of bores surrounding the first bore.

8. A pig launcher adapted for subsea installation to a subsea pipeline manifold by subsea engagement with a mating connector on the subsea pipeline manifold for launching multiple pigs into a subsea pipeline and for receiving pipeline fluid from the subsea pipeline manifold, said pig launcher comprising:

a dual-bore collet connector adapted for the subsea engagement, the dual-bore collet connector having a first bore for passing the pigs from the pig launcher and at least a second bore for receiving the pipeline fluid; and a rotary magazine for storing multiple pigs; the rotary magazine including a rotor defining pig storage locations and having an actuator coupled to the rotor for rotating the rotor to index the pigs to at least one launch position, the rotary magazine being coupled to the dual-bore collet connector for ejecting a pig at the launch position into and through the first bore of the dual-bore collet connector in a stream of the pipeline fluid received through the second bore of the dual-bore collet connector.

9. The pig launcher as claimed in claim 8, wherein the rotor defines a multiplicity of pig-storage chambers arranged in at least one circle.

10. The pig launcher as claimed in claim 8, further including an ejector pressure conduit coupled between the second bore of the dual-bore collet connector and the magazine for applying pipeline fluid pressure to the pig in the launch position for ejecting the pig in the launch position from the magazine.

11. The pig launcher as claimed in claim 8, wherein the dual-bore collet connector is a female dual-bore collet connector adapted for subsea engagement with a mating male hub on the subsea pipeline manifold.

12. A pig launcher adapted for subsea installation to a subsea pipeline manifold by subsea engagement with a mating connector on the subsea pipeline manifold for launching multiple pigs into a subsea pipeline and for receiving pipeline fluid from the subsea pipeline manifold, said pig launcher comprising:

a dual-bore collet connector adapted for the subsea engagement, the dual-bore collet connector having a first bore for passing the pigs from the pig launcher and at least a second bore for receiving the pipeline fluid; and a rotary magazine for storing multiple pigs; the rotary magazine including a rotor defining pig storage locations and having an actuator coupled to the rotor for rotating the rotor to index the pigs to at least one launch position, the rotary magazine being coupled to the dual-bore collet connector for ejecting a pig at the launch position into and through the first bore of the dual-bore collet connector in a stream of the pipeline fluid received through the second bore of the dual-bore collet connector;

wherein the rotor defines a multiplicity of pig-storage chambers arranged in at least one circle, and the magazine defines at least a first circle of the pig-storage chambers and at least a second circle of the pig-storage chambers, the first circle of pig-storage chambers having a first launch position, the second circle of pig-storage chambers having a second launch position, the pig-storage chambers in the first circle of pig-storage chambers being offset circumferentially from the pig-storage chambers in the second circle of pig-storage chambers, so that no more than one pig is at one of the launch positions at any given time.

13. A pig launcher adapted for subsea installation to a subsea pipeline manifold by subsea engagement with a mating connector on the subsea pipeline manifold for launching multiple pigs into a subsea pipeline and for receiving pipeline fluid from the subsea pipeline manifold, said pig launcher comprising:

a dual-bore collet connector adapted for the subsea engagement, the dual-bore collet connector having a first bore for passing the pigs from the pig launcher and at least a second bore for receiving the pipeline fluid; and a rotary magazine for storing multiple pigs; the rotary magazine including a rotor defining pig storage locations and having an actuator coupled to the rotor for rotating the rotor to index the pigs to at least one launch position, the rotary magazine being coupled to the dual-bore collet connector for ejecting a pig at the launch position into and through the first bore of the dual-bore collet connector in a stream of the pipeline fluid received through the second bore of the dual-bore collet connector;

wherein the first bore of the dual-bore collet connector is a central bore and the second bore of the dual-bore collet connector is one of a plurality of bores surrounding the first bore.

14. A subsea pig launching system for launching pigs into a subsea pipeline, said subsea pig launching system comprising:

a launcher manifold adapted for coupling between an upstream section of the subsea pipeline and a downstream section of the subsea pipeline to convey pipeline fluid from the upstream section of the pipeline through the launcher mainfold and to the downstream section of the subsea pipeline; and a pig launcher having a dual-bore collet connector and a magazine for storing a multiplicity of pigs, the collet connector being engageable with a mating connector on the launcher manifold, the dual-bore collet connector having a first bore for passing the pigs into the launcher manifold and at least a second bore for receiving pipeline fluid from the launcher manifold, the magazine indexing at least one pig to at least one launch position, the magazine being coupled to the dual-bore collet connector for ejecting a pig at the launch position into and through the first bore of the dual-bore collet connector in a stream of the pipeline fluid received through the second bore of the dual-bore collet connector, wherein the launcher manifold has a closure valve for closing off flow of pipeline fluid to the first bore of the collet connector when the collet connector is released, and wherein the launcher manifold has at least one valve for diverting pipeline fluid from the upstream section of the subsea pipeline to the second bore of the collet connector for ejecting the pig at the launch position.

15. The subsea pig launching system as claimed in claim 14, wherein the magazine includes a rotor defining pig storage locations and having an actuator coupled to the rotor for rotating the rotor to index the pigs to the launch position.

16. The subsea pig launching system as claimed in claim 14, wherein the pig launcher is supported upon the launcher manifold by the engagement of the dual-bore collet connector of the pig launcher with the mating connector on the launcher manifold.

17. The subsea pig launching system as claimed in claim 16, wherein the dual-bore collet connector is arranged to be aligned substantially vertically with respect to a seabed when the pig launching system is installed on the seabed.

18. The subsea pig launching system as claimed in claim 14, wherein the launcher manifold has a pyramidal receiver, and the pig launcher includes an inverted pyramidal base for seating on the pyramidal receiver of the subsea manifold, the inverted pyramidal receiver being coupled to the dual-bore collet connector for alignment of the dual-bore collet connector with the mating connector on the subsea pipeline manifold.

19. The subsea pig launching system as claimed in claim 18, wherein the dual-bore collet connector is arranged to be aligned horizontally with respect to a seabed when the pig launching system is installed on the seabed.

20. The subsea pig launching system as claimed in claim 14, which further includes a hydraulic control system for launching a pig upon cycling of hydraulic pressure.

* * * * *